United States Patent [19]

Keeney et al.

[11] 4,433,089

[45] Feb. 21, 1984

[54] INHIBITION OF POLYURETHANE HARDENING

[75] Inventors: C. Neil Keeney, Chesterfield, Mo.; Paul W. May, Jr., Fairview Heights; Albert W. Morgan, Collinsville, both of Ill.

[73] Assignee: Monsanto Company, St. Louis, Mo.

[21] Appl. No.: 386,835

[22] Filed: Jun. 10, 1982

Related U.S. Application Data

[63] Continuation of Ser. No. 942,231, Sep. 14, 1978, Pat. No. 4,349,640.

[51] Int. Cl.$^3$ .............................................. C08K 5/12
[52] U.S. Cl. .................................... 524/294; 524/759; 524/769; 524/761
[58] Field of Search ................................ 524/292, 294

[56] References Cited

U.S. PATENT DOCUMENTS

| | | | |
|---|---|---|---|
| 2,956,978 | 10/1960 | Reeves et al. | 260/31.4 R |
| 3,102,875 | 9/1963 | Heiss | 260/31.8 R |
| 3,489,723 | 1/1970 | Kraft | 260/31.4 R |
| 3,654,211 | 4/1972 | Lutz | 260/31.4 R |
| 4,014,845 | 3/1977 | Grier et al. | 260/31.4 R |

*Primary Examiner*—Paul R. Michl
*Attorney, Agent, or Firm*—George R. Beck; A. Milton Cornwell; Arthur E. Hoffman

[57] ABSTRACT

Elastomeric polyurethanes, e.g. as prepared by reacting diisocyanate-capped, essentially linear polyester or polyether and polyol suitable for cross-linking thereof, are inhibited against undesired hardening in use or storage by including in the polyurethane-forming reactant mixture a plasticizing composition composed of carboxylate having a 200–1,000 molecular weight and at least two monocyclic aryl radicals per molecule and, based on the weight of said carboxylate, 0.1–5% glycol having a 62–500 molecular weight.

12 Claims, No Drawings

INHIBITION OF POLYURETHANE HARDENING

This application is a continuation of copending application Ser. No. 942,231, filed Sept. 14, 1978, and now U.S. Pat. No. 4,349,640.

BACKGROUND OF THE INVENTION

It is well known to make elastomeric polyurethanes for various uses such as, e.g., roller covers for printing or other presses, impact-resistant coverings, gaskets, seals, etc. Typically, such polyurethanes can be produced by reacting essentially linear polyester or polyether prepolymer with at least one glycol or polyol suitable for cross-linking of the prepolymer, e.g. as described in U.S. Pat. No. 3,769,265 issued Oct. 30, 1973 to G. Grögler et al. As disclosed in that patent, plasticizers such as phthalic acid esters can be added in the preparation of such polyurethanes.

It has been found, however, that in extended storage or end use of many elastomeric polyurethanes, the polymer tends to harden, commonly to a degree which substantially impairs or even eliminates suitability of the polymer for its intended use as an elastomeric material. Hence it is highly desirable to provide a technique for inhibiting such hardening, and it is an object of this invention to provide such a technique. Another object is the provision of a polyurethane-plasticizing composition which inhibits undesired hardening of the polyurethane. Another object is an improved elastomeric polyurethane composition having an inhibited tendency toward such hardening. Other objects include improvements in the preparation of such polyurethanes whereby the resulting polymer is inhibited against such hardening. Additional objects will be apparent from the following disclosure in which all parts and percentages are by weight except where otherwise noted.

SUMMARY OF THE INVENTION

In accordance with this invention, it has been found that the aforementioned undesired hardening of elastomeric polyurethane compositions can be substantially and, in some cases, virtually completely inhibited by including in the mixture of reactants used to prepare the polyurethane a composition consisting essentially of polyurethane-plasticizing carboxylate having a molecular weight from about 200 to about 1,000 and at least two monocyclic aryl radicals per molecule and, based on the weight of said carboxylate, from about 0.1% to about 5% of at least one glycol having a molecular weight from 62 to about 500.

Thus, an elastomeric polyurethane composition substantially inhibited against such hardening can be prepared by subjecting to polyurethane-forming reaction conditions an elastomeric polyurethane-forming reactant mixture comprising (a) diisocyanate-capped, essentially linear polyester or polyether, (b) polyol suitable for cross-linking of said polyester or polyether to provide an elastomeric polyurethane, (c) polyurethane-plasticizing carboxylate having a molecular weight from about 200 to about 1,000 and at least two monocyclic aryl radicals per molecule and, based on the weight of said carboxylate, from about 0.1% to about 5% (d) glycol having a molecular weight from 62 to about 500.

Correspondingly, in a process for preparing such an elastomeric polyurethane, this invention provides an improvement which comprises inhibiting the polyurethane against undesired hardening by including in the mixture of polyester or polyether and polyol reacted to form the polyurethane a carboxylate as just described and, based on the weight of said carboxylate, from about 0.1% to about 5% glycol of the kind just mentioned.

DETAILED DESCRIPTION OF THE INVENTION

As used herein regarding polyurethane-plasticizing compositions consisting essentially of carboxylate and glycol, the term "consisting essentially" means that such compositions contain no other constituent which substantially alters the effect of the carboxylate and glycol on hardness stability of an elastomeric polyurethane produced with use of such a composition as described herein.

The polyurethanes to which this invention pertains include any of the various well-known solid, elastomeric varieties of the "low-durometer" kind, i.e., those characterized by a Shore A Hardness (measured in accordance with ASTM Method D 676-58T) from about 10 to about 100 and even more typically from about 20 to about 70. As is known in the art, a great variety of monomers can be used in the preparation of such polyurethanes. Normally, there is employed a prepolymer which is usually an essentially linear polyester, for instance the reaction product of a glycol such as an alkylene (e.g. $\alpha,\omega$-alkylene) glycol, preferably containing from two to about six carbon atoms per molecule, and a dicarboxylic acid such as an alkylene (e.g. $\alpha,\omega$-alkylene) dicarboxylic acid, preferably containing from about four to about eight carbon atoms per molecule, or an essentially linear polyether, for instance a polymer of a glycol such as an alkylene (e.g. $\alpha,\omega$-alkylene) glycol. Typically, the polyester or polyether is end-capped with a multifunctional isocyanate, for instance an arylene diisocyanate such as, e.g., toluene diisocyanate, or an alkylene diisocyanate such as, e.g., hexamethylene diisocyanate. By essentially linear is meant that the polyester or polyether has a relatively low degree of branching such that the average number of isocyanate end groups per molecule is from two to about six and preferably not more than about four. Average molecular weight of such an end-capped polyester or polyether is conventionally from about 500 to about 20,000 and even more typically from about 1,000 to about 6,000.

In accordance with the invention disclosed herein, preparation of the polyurethane is effected by reacting such a prepolymer with at least one polyol (i.e., reactant having more than two reactive hydroxyl groups) suitable for cross-linking of the prepolymer to provide an elastomeric polyurethane as described herein. Such a polyol typically has a molecular weight from about 100 to about 500 (preferably from about 200 to about 400) although those of lower or higher molecular weights can be used in some instances. Such polyols can be either straight-chain or cyclic. Triols are commonly preferred to avoid excessive cross-linking which would interfere with desired elasticity of the polyurethane. In general, such a polyol is employed in an amount capable of reacting with from about 90% to about 130% of the isocyanate end groups in the prepolymer used in preparation of the desired polyurethane. Numerous examples of such polyols, as well as polyester and polyether monomers and isocyanates useful in preparation of the afore-mentioned prepolymers, are disclosed in the published literature and may be readily found by reference thereto including, e.g., the afore-mentioned U.S. Pat. No. 3,769,265, the disclosure of which is incorporated herein by reference, and "Polyurethanes—Chemistry and Technology", J. H. Saunders and K. C. Frisch, Interscience Publishers, Division of John Wiley & Sons, Parts I & II (1962 & 1964); "The Development and Use of Polyurethane Products", E. N. Doyle, McGraw-Hill Book Co. (1971); and "A Glossary of Urethane Industry Terms", S. Alan Stewart, The Martin Sweets Co., Inc., Louisville, Ky. (1971).

As aforesaid, it has been found in accordance with this invention that undesired hardening of an elastomeric polyurethane, e.g. while in an end use having a required degree of elasticity (a maximum hardness) or in storage prior to such use, can be inhibited by preparing the polyurethane from polyurethane-forming reactants in admixture with a polyurethane-plasticizing composition comprising a carboxylate having at least two monocyclic aryl radicals per molecule and a molecular weight from about 200 to about 1,000. Typically, but not necessarily, the carboxylate contains no more than two of such aryl radicals. Also preferably, the carboxylate has a molecular weight from about 250 to about 500. Carboxylates especially preferred for such use include benzyl phthalates, e.g. $C_2$–$C_{12}$ alkyl benzyl phthalates such as butyl benzyl phthalate, heptyl benzyl phthalate, octyl benzyl phthalate, nonyl benzyl phthalate and texanol benzyl phthalate. (Texanol is 2,6,6,8-tetramethyl-4-oxo-3-oxononan-7-ol.) Also advantageously useful as such urethaneplasticizing carboxylates are various dibenzoates such as, e.g., di(propylene glycol)dibenzoate or di(ethylene glycol)dibenzoate. In most embodiments, such a carboxylate is included in the polyurethane-forming reactant mixture in an amount from about 10 to about 100 (preferably from about 20 to about 60) parts per 100 parts by weight of the end-capped prepolymer and cross-linking polyol in the mixture.

Also included in such a composition in accordance with this invention is a glycol (i.e., a dihydroxy compound otherwise called a diol) having a molecular weight from 62 to about 500, e.g. ethylene glycol, a propylene or butylene glycol, diethylene or dipropylene glycol or a pentane or hexane diol. Usually, for better compatibility with the carboxlyate plasticizer, the glycol employed preferably has a molecular weight of at least about 76, and even more desirably at least about 90. Generally, e.g. for reasons of cost, it is also desirable to use a glycol having a molecular weight not higher than about 250, and even more advantageously not higher than about 150. Also preferably, the glycol is an alkylene glycol (even more preferably an α,ω-alkylene glycol) such as, e.g., 1,3-propylene glycol, 1,4-butylene glycol, 1,6-hexane diol, dipropylene glycol or, typically most preferred, diethylene glycol. (As used herein, the term "alkylene glycol" embraces oligomeric alkylene glycols such as, e.g., diethylene or dipropylene glycol, as well as monomeric alkylene glycols such as, e.g., ethylene glycol or 1,4-butane diol.)

Normally, the glycol should be present in the compositions of this invention in an amount, based on the weight of the polyurethane-plasticizing carboxylate, from about 0.1% to about 5%, and preferably from about 0.5% to about 3%. As expressed herein with reference to inclusion in a mixture of polyurethane-forming reactants, the just-mentioned amounts of a glycol should be understood as being in addition to any glycol contained in the aforementioned polyester or polyether prepolymer. Expressed otherwise, such amounts of glycol refer to those added to the aforementioned compositions as free (unreacted) glycol, as distinguished from glycol that has been effectively neutralized, e.g. by reaction with an acid to form a polyester or by polymerization to form a polyether.

In preparation of elastomeric polyurethanes as described herein the prepolymer, cross-linking polyol, carboxylate plasticizer and glycol can be combined in any convenient sequence. For best results, however, and particularly with respect to inhibition of hardness of the resulting polyurethane, it is preferred that the prepolymer, carboxylate and glycol be combined (generally at elevated temperature) before addition of the polyol to the reaction mixture.

As aforesaid, the process improvements and compositions of this invention inhibit the tendency of elastomeric polyurethanes, as described herein, to undergo the gradual, undesired hardening which has been heretofore a major drawback to large-scale commercial use of such polyurethanes. In many uses, e.g. printing rollers, a hardening of about 10% or more as measured in terms of Shore A Hardness is considered a serious problem in that it substantially impairs the suitability of the polyurethane for such uses. The present invention, however, has been found to limit increases in such polyurethane hardness over extended periods of time to percentages substantially lower than 10% and, in some embodiments, to maintain the polyurethane hardness essentially constant over extended time periods.

EXAMPLE I

40 Parts of a homogeneous plasticizer composition consisting of 99% butyl benzyl phthalate and 1% ethylene glycol and 100 parts of polyurethane prepolymer were separately warmed to 66° C. and then stirred together. The prepolymer, classified as an 80-durometer (unplasticized) resin, was a polyester of reactants consisting essentially of ethylene glycol and adipic acid, end-capped with toluene diisocyanate and having an average molecular weight between 3,500 and 4,000 and an average number of isocyanate groups per molecule of 3.25. The blended mixture was then heated in an oven to 93° C. 6.9 parts of a conventional polyurethane cross-linking triol having a molecular weight of approximately 270, an OH content of 18.8%, and OH number of 620, a viscosity of 750 cps and a 1.15 specific gravity was blended into the mixture which was then deaerated under essentially full vacuum (5 mm Hg.) for 10 minutes in a 93° C. oven, cured for two hours at 149° C. and then post-baked for 16 hours at 100° C. Shore A Hardness of the resulting elastomeric polymer was 24. It rose to 25 (a 4% increase) after two days of storage under standard conditions (22±1.5° and 50±5% relative humidity) but then remained constant at that level throughout a period of six months under those conditions.

COMPARATIVE EXAMPLE A

When the procedure of Example I was essentially duplicated except that the plasticizer composition was 100% butyl benzyl phthalate, Shore A Hardness of the resulting polyurethane increased 9% within the first three days and remained essentially constant at that level.

EXAMPLE 2

When the procedure of Example I was essentially duplicated except that the plasticizer composition consisted of 98.3% butyl benzyl phthalate and 1.7% diethylene glycol, Shore A Hardness of the resulting polymer (approximately 25) remained unchanged throughout a period of six months.

COMPARATIVE EXAMPLE B

When the procedure of Example II was essentially duplicated except that the plasticizer was 100% di(methoxyethyl)phthalate, Shore A Hardness of the resulting polyurethane increased substantially within several days to a degree considered unattractive for use of the polyurethane in printing roller covers, and remained essentially constant at that level.

What is claimed is:

1. Composition consisting essentially of butyl benzyl phthalate and, based on the weight of said phthalate, from about 0.1% to about 5% ethylene glycol.

2. Composition of claim 1 containing from about 0.5% to about 3% glycol, based on the weight of said phthalate.

3. Composition consisting essentially of polyurethane-plasticizing carboxylate selected from the group consisting of $C_2$–$C_{12}$ alkyl benzyl phthalates other than butyl benzyl phthalate and, based on the weight of said carboxylate, from about 0.1% to about 5% glycol having a molecular weight from 62 to about 500.

4. Composition of claim 3, said glycol consisting essentially of alkylene glycol having a molecular weight from about 76 to about 250.

5. Composition of claim 3, said glycol consisting essentially of ethylene glycol.

6. Composition of claim 3 consisting essentially of said carboxylate and, based on the weight of said carboxylate, from about 0.5% to about 3% glycol, said glycol consisting essentially of $\alpha,\omega$-alkylene glycol having a molecular weight from about 90 to about 150.

7. Composition of claim 6, said glycol consisting essentially of diethylene glycol.

8. Composition of claim 3, said carboxylate being selected from the group consisting of heptyl benzyl phthalate, octyl benzyl phthalate, nonyl benzyl phthalate and texanol benzyl phthalate.

9. Composition consisting essentially of polyurethane-plasticizing carboxylate selected from the group consisting of heptyl benzyl phthalate, octyl benzyl phthalate, nonyl benzyl phthalate, texanol benzyl phthalate, di(propylene glycol)dibenzoate and di(ethylene glycol)dibenzoate and, based on the weight of said carboxylate, from about 0.1% to about 5% glycol having a molecular weight from 62 to about 500.

10. Composition of claim 9, said glycol consisting essentially of alkylene glycol having a molecular weight from about 76 to about 250.

11. Composition of claim 9, said glycol consisting essentially of ethylene glycol.

12. Composition of claim 9, said glycol consisting essentially of diethylene glycol.

* * * * *